No. 753,432. PATENTED MAR. 1, 1904.
A. G. RAMAGE & G. MACMILLAN.
SPRING WHEEL FOR VEHICLES.
APPLICATION FILED JULY 23, 1903.

NO MODEL.

No. 753,432. Patented March 1, 1904.

UNITED STATES PATENT OFFICE.

ALEXANDER GULLILAND RAMAGE, OF LEITH, AND GEORGE MACMILLAN, OF CORSTORPHINE, SCOTLAND.

SPRING-WHEEL FOR VEHICLES.

SPECIFICATION forming part of Letters Patent No. 753,432, dated March 1, 1904.

Application filed July 23, 1903. Serial No. 166,741. (No model.)

*To all whom it may concern:*

Be it known that we, ALEXANDER GULLILAND RAMAGE, engineer, residing at 6 Derby street, Leith, and GEORGE MACMILLAN, engineer, residing at Corstorphine Hill House, Corstorphine, in the county of Edinburgh, Scotland, have invented certain new and useful Improvements in Spring-Wheels for Vehicles, of which the following is a specification.

According to this invention the rim of the wheel is provided with short inwardly-projecting spokes, which by means of links are hinged to spring-spokes. The spring-spokes may be made of one or more pieces of spring-steel and where they cross each other may be "set" or ground to meet each other. The spring-spokes may be four in number, and in this case, if straight, may be at right angles to each other, although they may be slightly curved outward or inward from the center of the circle. The spring-spokes are connected from their centers by arms, which carry the hub.

Figure 1:
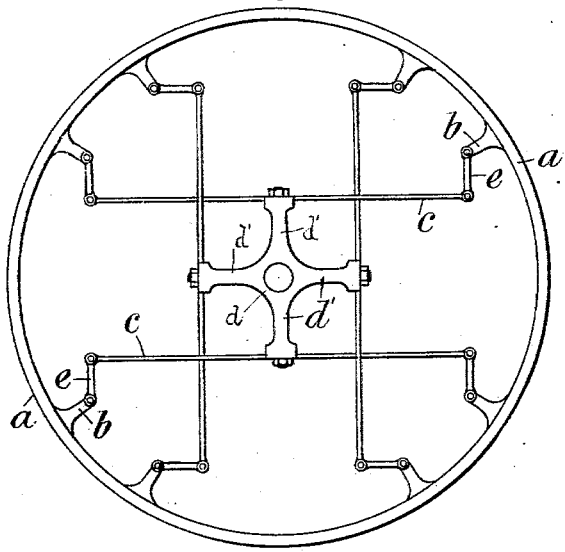
Figure 2:
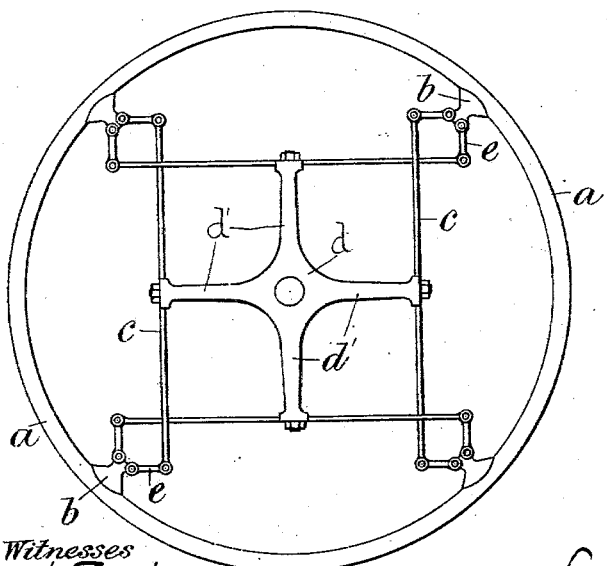

Figure 1 is a side elevation of a wheel constructed according to this invention, and Fig. 2 is a similar view of a modification.

In the figures, $a$ is the rim of the wheel. $b$ represents short spokes projecting inwardly from it.

$c$ represents spring-spokes fixed to rigid radial arms $d'$, fixed to the hub $d$, and $e$ represents links connecting the spokes $b$ and $e$.

What we claim is—

The combination of a rim, short spokes projecting inwardly from it, a hub, arms projecting radially from it, spring-spokes fixed to the arms and links connecting the ends of the two sets of spokes.

ALEXANDER GULLILAND RAMAGE. [L. S.]
GEORGE MACMILLAN. [L. S.]

Witnesses:
GEORGE HUTTON,
GEORGE COBBS.